United States Patent [19]

Rockstroh et al.

[11] Patent Number: 5,012,087
[45] Date of Patent: Apr. 30, 1991

[54] FIBER OPTIC SAFETY SYSTEM

[75] Inventors: Todd J. Rockstroh, Maineville; SeethaRamaiah Mannava, Cincinnati, both of Ohio

[73] Assignee: General Electric Company, Cincinnati, Ohio

[21] Appl. No.: 337,788

[22] Filed: Apr. 13, 1989

[51] Int. Cl.⁵ .................. H01J 5/16; G01N 21/00
[52] U.S. Cl. ................ 250/227.15; 356/73.1
[58] Field of Search ............ 250/227, 205, 227.15; 219/121.6, 121.61, 121.62, 121.76, 121.77; 356/73.1, 237, 239; 128/303.1, 395, 397

[56] References Cited

U.S. PATENT DOCUMENTS

| | | | |
|---|---|---|---|
| 3,981,592 | 9/1976 | Williams | 356/237 |
| 4,298,794 | 11/1981 | Snitzer et al. | 250/227 |
| 4,311,142 | 1/1982 | Machida | 128/303.1 |
| 4,316,467 | 2/1982 | Muckerheide | 128/303.1 |
| 4,385,832 | 5/1983 | Doi et al. | 356/73.1 |
| 4,422,457 | 12/1983 | Hattori | 128/303.1 |
| 4,423,726 | 1/1984 | Imagawa et al. | 128/303.1 |
| 4,476,512 | 10/1984 | Sunago et al. | 361/103 |
| 4,543,477 | 9/1985 | Doi et al. | 250/227 |
| 4,556,875 | 12/1985 | Ishiwatari | 340/679 |
| 4,580,557 | 4/1986 | Hertzmann | 128/303.1 |
| 4,669,467 | 6/1987 | Willett et al. | 128/303.1 |
| 4,682,594 | 7/1987 | Mok | 219/121.62 |
| 4,695,697 | 9/1987 | Kosa | 219/121.62 |
| 4,716,288 | 12/1987 | Doi | 250/227 |
| 4,785,806 | 11/1988 | Deckelbaum | 128/303.1 |
| 4,812,641 | 3/1989 | Ortiz, Jr. | 219/121.62 |

FOREIGN PATENT DOCUMENTS 0113104 11/1984 European Pat. Off. .
0054937 3/1984 Japan ................. 356/73.1

Primary Examiner—David C. Nelms
Assistant Examiner—Michael Messinger
Attorney, Agent, or Firm—Jerome C. Squillaro; Charles L. Moore, Jr.

[57] ABSTRACT

A system for detecting energy leakage from an optical fiber transmitting high power laser beams. A second optical fiber is placed together with the laser power transmitting fiber into a jacketing tube or conduit. The second fiber is connected at one end to a light source and at the other end to a photosensitive diode. Leakage of laser energy from the power transmitting fiber will cause a failure of the second optical fiber, reducing or terminating the transmission of light to the photosensitive diode. Energy leakage from the laser power transmitting fiber can therefore be detected by monitoring the output of the photosensitive diode.

16 Claims, 1 Drawing Sheet

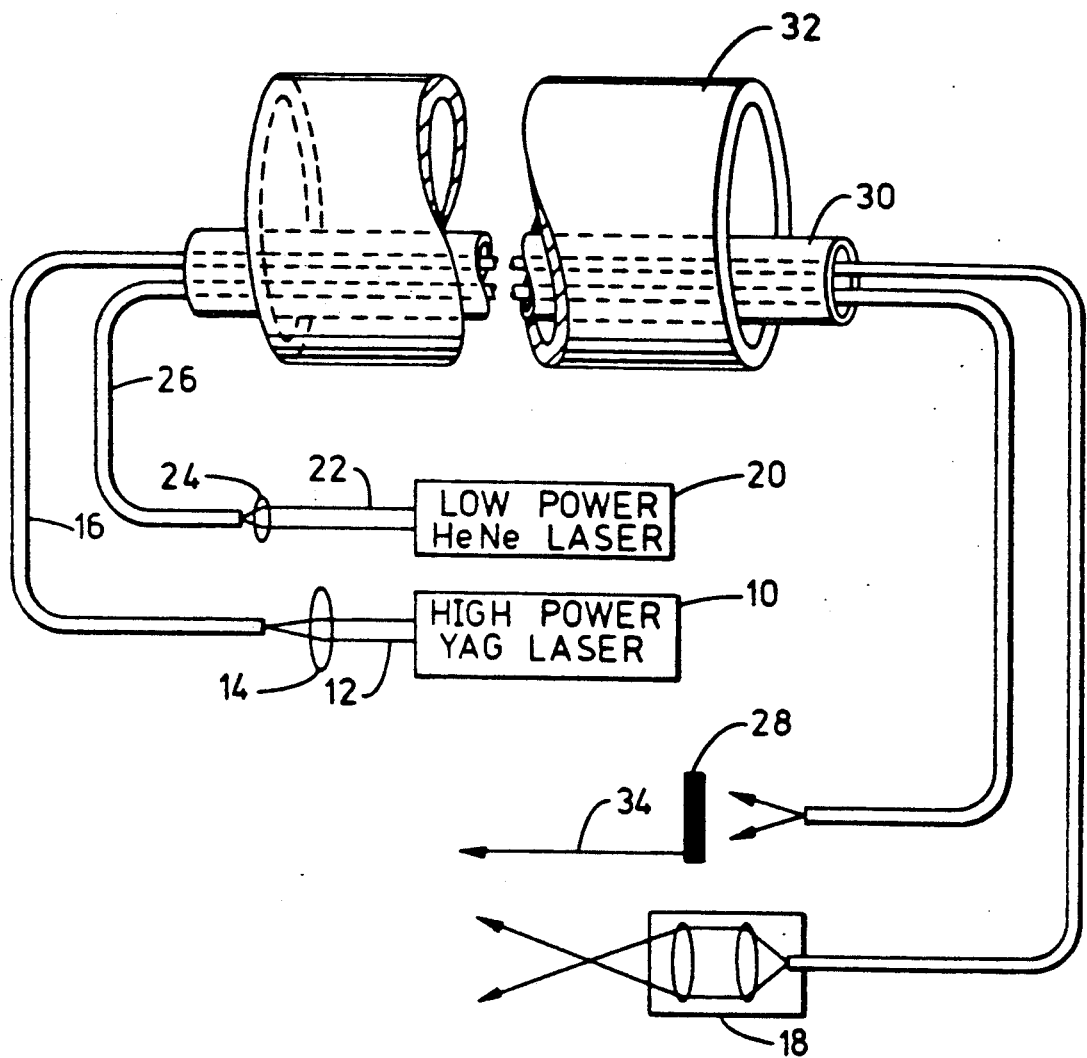

FIBER OPTIC SAFETY SYSTEM

The present invention relates generally to a safety system capable of detecting a failure of a fiber optic cable and more particularly a system for detecting energy leakage from an optical fiber transmitting a high power laser beam.

BACKGROUND OF THE INVENTION

Optical fibers have been utilized in industrial applications as a simple means for guiding a laser beam from a laser source to a work station where a workpiece to be drilled, cut, or otherwise machined is located. However, the use of optical fibers for transmitting high power laser energy in a production environment requires a safety system to rapidly cease laser operation in the event of a catastrophic failure of the fiber and therefore prevent high energy laser leakage from damaging neighboring hardware or personnel.

Conventional safety systems which directly monitor laser energy emitted from the output end of the fiber are disadvantageous in that space may not be available at the output end of the fiber for positioning the necessary sensing apparatus, the sensing apparatus may reduce the power delivered to the laser operation, or apparatus placed in the path of a high power laser beam may be susceptible to damage inflicted by the laser beam. Additionally, such a system would be unable to differentiate between a fiber failure and the failure of another component in the laser operation, such as the laser source.

OBJECTS OF THE INVENTION

It is a primary object of the present invention to provide a new and improved apparatus for detecting laser energy leakage from an optical fiber transmitting a high power laser beam.

It is an additional object of the present invention to provide a comparatively simple and inexpensive system for ceasing operation of a high power laser which utilizes an optical fiber for transmitting laser energy in the event of a failure of the optical fiber.

SUMMARY OF THE INVENTION

In accordance with the principles of the present invention, there is provided an improved apparatus for detecting the leakage of laser energy from a laser power transmitting optical fiber. The apparatus includes a second optical fiber, a jacketing tube or conduit into which both optical fibers are placed, and means for detecting a failure of the second fiber. In the event of a failure of the laser power transmitting fiber the second optical fiber would be damaged by the escaping laser energy. Energy leakage from the laser power transmitting fiber can therefor be detected by detecting a failure in the second optical fiber. The apparatus may further include means responsive to the detecting means to discontinue the supply of laser energy to the laser power transmitting optical fiber.

The novel features believed to be characteristic of the present invention are set forth in the claims. The above and other objects of the present invention together with the features and advantages thereof will become apparent from the following detailed specification when read in conjunction with the accompanying drawing.

BRIEF DESCRIPTION OF THE DRAWING

The accompanying FIGURE is a simplified illustration of an optical fiber system constructed in accordance with the present invention.

DETAILED DESCRIPTION OF THE INVENTION

The FIGURE illustrates a preferred embodiment of the system conceived by the present invention which provides for the detection of laser energy leakage from an optical fiber transmitting a high power laser beam.

In the FIGURE, reference numeral 10 designates a high power laser source, such as a 400 watt YAG (yttrium-aluminum-garnet) laser. A laser beam 12, emitted from laser source 10 is focused by lens 14 onto the incident end of an optical fiber 16 and transmitted along the fiber to a work station where a laser operation, such as cutting or welding, is to be performed. The laser operation receives the laser beam through a fiber optic coupler 18 provided at the emergent end of fiber 16.

The safety system includes a light source 20, such as a low power HeNe laser, for generating a light beam 22, a lens 24 for focusing the light beam onto the incident end of a safety detector optical fiber 26, and a photodiode 28 positioned at the emergent end of fiber 26. Laser power transmitting fiber 16, hereinafter referred to as the first optical fiber, and safety detector optical fiber 26, hereinafter referred to as the second optical fiber, are enclosed together for substantially their entire lengths in a protective jacketing tube 30. Both fibers and jacketing tube 30 are further enclosed within a flexible metal conduit 32. The two fibers are held in close proximity to each other except near their ends, where seperation is necessary to connect the fibers to light sources 10 and 20, fiber output coupler 18, and photodiode 28.

During operation of laser 10, and while laser beam 12 is being transmitted through first fiber 16 light source 20 provides a "safety" signal, in the form of light beam 22, to photodiode 28 through second fiber 26. The light energy impinging the surface of the photodiode is thereafter converted to an electrical signal provided on a line 34. Should first fiber 16 break or otherwise fail at any point within jacketing tube 30 the high energy laser leakage would damage second fiber 26 reducing or eliminating the receipt of light beam 22 by photodiode 28. Although second fiber 26 would almost immediately be destroyed, the escaping laser energy would not have sufficient energy density to damage the conduit walls on a short term basis.

Destruction of second fiber 26 and the resulting reduction or loss of light energy delivered to photodiode 28 reduces the magnitude of the electrical signal provided on line 34. Line 34 may be electrically connected to an interlock or relay (not shown) which operates to shut off power to the high power laser when the electrical signal on line 34 drops below a predetermined value, thereby preventing laser energy from the failed optical fiber from damaging neighboring hardware or personnel. As an alternative to an interlock or relay, a shutter (not shown) may be provided between the laser source and the incident end of first fiber 16, closing to prevent laser energy from being injected into first fiber 16 upon loss of signal from photodiode 28.

Several advantages of this invention are readily apparent. The system presented above is simple in construction and the individual components are readily available and inexpensive.

From the foregoing specification it will be clear to those skilled in the art that the present invention is not limited to the specific embodiment described and illustrated and that numerous modifications and changes are possible without departing from the scope of the present invention. For example, the invention as described above utilizes a HeNe laser for generating a safety signal. However, any source for generating visible or non-visible light may be utilized to provide the safety signal. The system can be used to detect leakage from laser power transmitting optical fibers carrying other than YAG laser beams, for example, $CO_2$ laser beams. In another embodiment of the invention, reflecting means may be provided at one end of the safety signal transmitting fiber thereby permitting the safety signal light source and photo sensitive diode to be positioned at the same end of the fiber. Also, the optical fibers need not be placed within both a jacketing tube and conduit. One properly constructed tube could provide the appropriate safety and operation.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for detecting a failure in a laser power transmitting optical fiber, the apparatus comprising:
    a single safety detector optical fiber extending along the laser power transmitting optical fiber substantially the entire length thereof;
    a jacketing tube, said laser power transmitting fiber and said safety detector fiber being contained within said tube such that laser energy leakage from said laser power transmitting fiber within said tube will cause a failure of said safety detector fiber; and
    means for sensing a failure of said safety detector fiber indicative of a failure of said laser power transmitting fiber, said sensing means being positioned at an emergent end of said safety detector optical fiber, proximate to an output end of the laser power transmitting optical fiber.

2. Apparatus according to claim 1, wherein
    said safety detector optical fiber includes an incident end; and
    said means for sensing the failure of said safety detector fiber includes a light source optically coupled to said incident end of said safety detector fiber for supplying a safety signal to be carried by said safety detector fiber, and a photosensitive diode optically coupled to receive said safety signal from the emergent end of said safety detector fiber.

3. In a laser machining system including a laser power source optically coupled to one end of a laser power transmitting optical fiber for supplying a laser power beam to be carried by said fiber, fault detecting means comprising:
    a light source for generating a safety signal;
    a single safety signal transmitting optical fiber extending along the laser power transmitting optical fiber substantially the entire length thereof and having an incident end and an emergent end, said incident end being optically connected to said light source;
    a jacketing tube, said laser power transmitting fiber and said safety signal transmitting fiber being contained within said tube such that laser energy leakage from said laser power transmitting fiber within said tube will cause a failure of said safety signal transmitting fiber, inhibiting transmission of said safety signal; and
    means, optically connected to receive said safety signal from the incident end of said safety signal transmitting fiber, for generating a signal indicating a failure of said safety signal transmitting fiber, said signal generating means being positioned at said emergent end of said safety signal transmitting fiber, proximate to an output end of the laser power transmitting optical fiber.

4. Apparatus according to claim 3 wherein said light source is a HeNe laser.

5. Apparatus according to claim 3 and further comprising means responsive to said safety signal receiving means for discontinuing the supply of said laser power beam to said laser power transmitting fiber upon the failure of said safety signal transmitting fiber.

6. Apparatus according to claim 5, wherein said means for discontinuing the supply of said laser power beam comprises a relay for turning off said laser power source upon the failure of said safety signal transmitting fiber.

7. Apparatus according to claim 5, wherein said means for discontinuing the supply of said laser power beam includes a shutter for preventing said laser power beam from being supplied to said first fiber upon failure of said safety signal transmitting fiber.

8. Apparatus for transmitting laser energy comprising:
    a first optical fiber for transmitting a laser power beam;
    a single second optical fiber for transmitting a safety signal extending along said first optical fiber substantially the entire length thereof;
    a jacketing tube, said first and second optical fibers being contained within said tube such that laser energy leakage from said first fiber within said tube will cause a failure of said second fiber;
    means for sensing the failure of said second fiber, said sensing means being positioned at an emergent end of said second optical fiber, proximate to an output end of said first optical fiber; and
    means for discontinuing transmission of said laser power beam upon failure of said second fiber.

9. Apparatus according to claim 8, wherein:
    said second optical fiber includes an incident end; and
    said means for sensing the failure of said second fiber includes a light source optically coupled to said incident end of said second fiber for supplying a safety signal to be carried by said second fiber, and a photosensitive diode optically coupled to receive said safety signal from the emergent end of said second fiber.

10. Apparatus according to claim 8, and further comprising a flexible metal conduit, said jacketing tube being contained within said conduit.

11. Apparatus consisting of:
    a first optical fiber;
    a laser power source optically coupled to one end of said first fiber for supplying a laser power beam to be carried by said first fiber;
    a single second optical fiber extending along said first optical fiber substantially the entire length thereof;
    a jacketing tube, through which said first and second optical fibers are run such that laser energy leakage from said first fiber within said tube will cause a failure of said second fiber;

a flexible metal conduit, said jacketing tube being contained within said conduit;

means for sensing the failure of said second fiber, said sensing means being positioned at an emergent end of said second optical fiber, proximate to an output end of said first optical fiber; and means for discontinuing the supply of said laser power beam to said first optical fiber upon sending a failure of said second fiber.

12. Apparatus according to claim 11, wherein:

said second optical fiber includes an incident end; and said means for sensing the failure of said second fiber includes a light source optically coupled to said incident end of said second fiber for supplying a safety signal to be carried by said second fiber, and a photosensitive diode optically coupled to receive said safety signal from the emergent end of said second fiber.

13. Apparatus according to claim 12, wherein said means for discontinuing the supply of said laser power beam comprises a relay responsive to the output of said photosensitive diode to turn off said laser power source upon loss of transmission of said safety signal to said photosensitive diode.

14. Apparatus according to claim 12, wherein said means for discontinuing the supply of said laser power beam includes a shutter responsive to the output of said photosensitive diode for preventing said laser power beam from being supplied to said first fiber upon loss of transmission of said safety signal to said photosensitive diode.

15. Apparatus according to claim 12, wherein said light source is a HeNe laser.

16. Apparatus according to claim 11, wherein said laser power source is a YAG laser.

* * * * *